(12) United States Patent
Bruschke et al.

(10) Patent No.: US 7,655,141 B2
(45) Date of Patent: Feb. 2, 2010

(54) MEMBRANE PIPE MODULE

(75) Inventors: Hartmut E. A. Bruschke, Nussbloch (DE); Nicholas Patrick Wynn, Sarreguémines (FR); Frank-Klaus Marggraff, Homburg (DE)

(73) Assignee: Sulzer Chemtech GmbH-Membrantechnik, Neunkirchen (DE)

( * ) Notice: Subject to any disclaimer, the term of this patent is extended or adjusted under 35 U.S.C. 154(b) by 392 days.

(21) Appl. No.: 10/557,496

(22) PCT Filed: May 19, 2004

(86) PCT No.: PCT/EP2004/005405

§ 371 (c)(1),
(2), (4) Date: Jul. 25, 2006

(87) PCT Pub. No.: WO2004/103531

PCT Pub. Date: Dec. 2, 2004

(65) Prior Publication Data

US 2007/0039886 A1    Feb. 22, 2007

(30) Foreign Application Priority Data

May 23, 2003    (DE) ................................ 103 23 440

(51) Int. Cl.
*B01D 63/06* (2006.01)
*B01D 61/36* (2006.01)
*B01D 61/00* (2006.01)

(52) U.S. Cl. ............................ 210/321.78; 210/321.87; 210/308; 210/323.2

(58) Field of Classification Search .................. 210/308, 210/323.2

See application file for complete search history.

(56) References Cited

U.S. PATENT DOCUMENTS

| 4,376,095 | A | | 3/1983 | Hasegawa |
| 4,718,985 | A | | 1/1988 | Kjellander |
| 4,755,299 | A | | 7/1988 | Bruschke |
| 4,778,569 | A | | 10/1988 | Ostertag |
| 4,791,054 | A | | 12/1988 | Hamada et al. |
| 4,897,191 | A | * | 1/1990 | Langerak et al. ........ 210/321.81 |
| 4,915,834 | A | | 4/1990 | Bruschke |
| 5,156,740 | A | | 10/1992 | Bruschke |
| 5,914,039 | A | * | 6/1999 | Mahendran et al. .... 210/500.25 |
| 2004/0211726 | A1 | * | 10/2004 | Baig et al. .................. 210/640 |

FOREIGN PATENT DOCUMENTS

| DE | 19900432 A | 7/2000 |
| EP | 0343895 A | 11/1989 |
| GB | 2197598 | 5/1988 |
| JP | S56-151608 | 11/1981 |
| JP | S59-109204 | 6/1984 |
| JP | 2003-093843 | 4/2003 |

* cited by examiner

Primary Examiner—Krishnan S Menon
(74) Attorney, Agent, or Firm—RatnerPrestia

(57) ABSTRACT

The invention relates to a membrane pipe module, said module comprising a cylindrical housing containing a plurality of tubular membrane sections which extend in the axial direction and are interconnected at the ends thereof, forming longer tubular membrane sections. Said cylindrical housing comprises a heatable chamber, on one or both sides, comprising U-shaped connection pipes which are arranged therein and are guided through a separating wall between the chamber and the housing, with the two open ends thereof, and respectively connect two adjacent open tubular membrane sections, forming a membrane loop.

4 Claims, 2 Drawing Sheets

MEMBRANE PIPE MODULE

CROSS-REFERENCE TO RELATED APPLICATIONS

This application is a U.S. National Phase Application of PCT International Application PCT/EP2004/005405, filed May 19, 2004.

FIELD OF THE INVENTION

The invention relates to a tube module comprising tubular membranes and integrated heat exchange.

BACKGROUND OF THE INVENTION

The membranes used in membrane technology for the separation of liquid or gaseous mixtures are incorporated in useful arrangement in modules. General known forms of such modules are those with pleated membranes, plate modules, and spiral wound modules on one side, and hollow fiber, capillary, tubular, or tube modules on the other side. The first group of modules is used for flat sheet membranes, the second one for membranes in tubular form. The diameter of the respective tubular membranes vary between 30μ to 100μ for hollow fiber modules, between 0.2 mm to 3 mm for capillary modules, and in the range between 4 mm to 50 mm for tubular or tube modules. The transmembrane flux is directed from the outside to the inside for hollow fibers, in capillary membranes it may be directed from the outside to the inside as well as from the inside to the outside, in tubular or tube membranes it is in general directed from the inside to the outside.

In tubular or tube modules the membrane is arranged in form of a tube or flexible hose on the inside of pressure resistant support tubes, whereby the material of the support tubes may have a sufficient porosity and permeability for the permeate. When the material of the support tube is not sufficiently permeable the support tube has to be provided with a suitable number of bores or holes for the removal of the permeate. In this case it may be useful to install an additional porous tube, e.g. made from porous polyethylene, between the membrane and the support tube. Such an arrangement will allow for an unhindered drainage of the permeate between the holes in the support tube and support the membrane additionally over the holes. The membranes are either exchangeable or fixed to the support material. Following this construction modules incorporating membranes in the form of tubes or flexible hoses with a diameter in the above mentioned range of 4 mm to 50 mm, provided with a support layer are known in the state of art as tube modules and the respective membranes as tubular ones. Depending on the respective process the tubular membranes of a tube module may be passed in series by the mixture to be separated or two or a plurality of tubular membranes may be passed in parallel. Following the necessities of a respective process any combination of serial or parallel passage can be verified.

Depending on their respective characteristics tubular membranes are employed e.g. in the processes of microfiltration, ultrafiltration or reverse osmosis and those of pervaporation and vapor permeation. In the process of pervaporation for the separation of liquid mixtures the heat for the evaporation of the permeate is taken from the sensible heat of the liquid mixture, the thus caused decrease in temperature leads to a reduction of the driving force, and hence the flux through the membrane, and thus to a decrease in the performance of the process. In the separation of vaporous or gaseous mixtures unavoidable heat losses may lead to a cooling of the feed mixture and condensation of components out of the mixture, as a consequence blocking of the flux through the membrane can occur. Therefore it is desirable to replace the lost heat to the feed mixture. In tube modules of state-of-art technology this reintroduction of lost heat is effected stepwise by heating the mixture to be separated in intermediate heat exchangers outside of the module. After leaving the intermediate heat exchanger and entrance into the module no supply of heat is possible in the tube modules of the state-of art technology. Especially in tube modules with long membrane tubes or flexible hoses and a respectively large membrane area combined with a large amount of permeate significant cooling of the feed mixture may occur which will affect the separation or stop it at all. Therefore only modules with a limited membrane area can be employed, with intermediate heat exchanger between each two modules. The thereby unavoidable limitation in membrane area per module, the required number of intermediate heat exchangers, the additionally necessary piping connection between these apparatus and the additional expenses for controls lead to an uneconomical increase in the specific costs per membrane area installed. The task of the present invention follows immediately from these considerations.

SUMMARY OF THE INVENTION

The task is solved in the present invention by a tube module in which a multitude of tubular membrane segments is arranged in a cylindrical housing in an axial direction, these segments, if necessary, being at their ends partially interconnected with each other, forming longer tubular membrane segments, and characterized by the fact that said tube module is provided at one or both ends of the cylindrical housing with each a heating chamber, these heating chambers provided with U-shaped interconnecting tubes, the open ends of these U-shaped tubes leading through a wall separating the heating chambers and the housing, and connecting two adjacent open tubular membrane segments, forming a tubular membrane infinite loop.

DETAILED DESCRIPTION Of THE INVENTION

Figure 1:
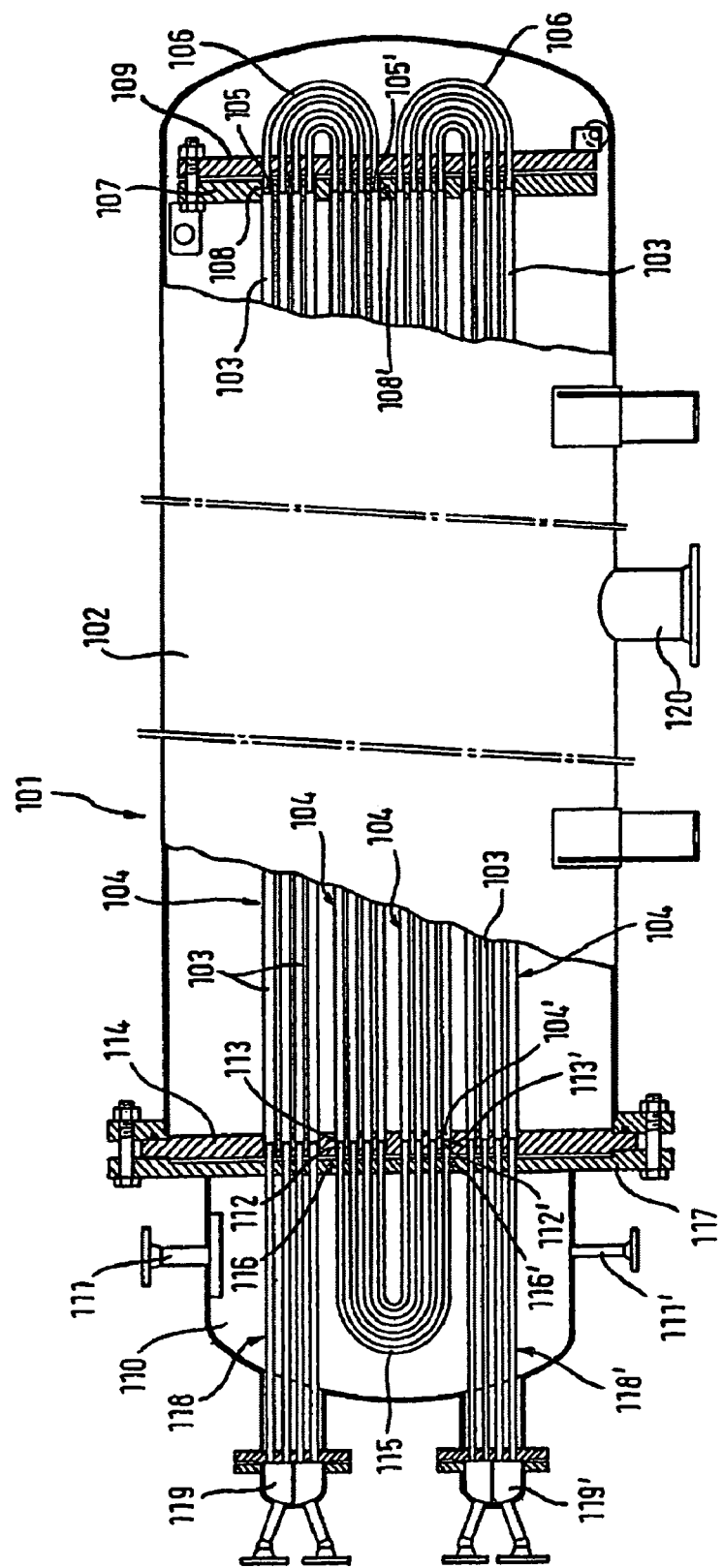
FIG. 1 shows a module of the invention having one heating chamber on one side only.

In the state-of-art tube modules the tubular membrane segments arranged in a cylindrical housing are interconnected at their ends forming infinite membrane tubes. The tube module of the present invention differs from the state-of-art by the fact that a certain number of adjacent tubular membrane segments at one or both ends of the cylindrical housing is left open, these ends being connected by said U-shaped interconnecting tubes which lead with their open ends through the wall separating the cylindrical housing and the heating chamber. The feed mixture to be separated passes through the U-shaped interconnecting tubes inside the heating chambers where the required heat can be supplied. The heating chambers thus function as heat exchangers the heat being supplied e.g. by steam or another heat transfer medium.

In a preferred embodiment of the tube module of the present invention the tubular membrane segments are fixed at one end or at both ends in a plate provided with bores. Through these bores the open end of the U-shaped interconnecting tubes are led, naturally provided with a sealing. Tubular membrane segments not connected to the heat exchanger can be interconnected inside the housing or, when fixed in bores of an end plate, by respective clearances in the end plate.

The cylindrical housing of the tube module may be made from steel, or another metal, or from plastic, provided with respective opening for the removal of the permeate.

The heating chambers used as heat exchangers are provide with respective openings for the inlet and outlet of a heat transfer medium. When steam is used as a heat transfer medium the heating chambers have to be designed resistant against the respective temperature and pressure, preferentially from steel.

In another preferred embodiment heating chambers as heat exchangers are furnished at both ends of the cylindrical housing. Each chamber may be provided with respective means for temperature control. When heating chambers are arranged at both ends of the cylindrical housing at least one of the chambers has to be provided with respective ducts for the inlet and outlet of the fluid to be treated by the tube module.

In another preferred embodiment the heating chambers at one or both end are formed as removable means. This facilitates the exchange of damaged tubular membrane segments in case of an incident.

The tube module of the present invention is useful for all types of tubular membranes, at one side for the conventional type with a support tube, with the support either permeable for the permeate, or when impermeable with an additional porous tube between the support tube and the tubular membrane. On the other side and preferentially for such tubular membranes in which the membrane layer, support layer and, if necessary an additional carrier layer form one device. For the separation of liquid mixtures according to the pervaporation process multi-layer membranes are preferred, which consist of at least two layers of different chemical composition, with an additional carrier layer made from non-woven or woven fabric, if necessary. In general such multi-layer or composite membranes consist of a porous substructure, responsible mainly for the mechanical stability of the membrane (support layer), and on top of that a layer of a material of different chemical characteristic, being mainly responsible for the separation properties of the membrane (separating layer). Preferentially an additional carrier layer made from non-woven or woven fabric is arranged below the support layer. Such composite membranes used as flat sheets in pervaporation or vapor permeation or gas separation processes for the separation of liquid mixture which are difficult to separate by distillation, are known from EP-B-0 096 339. These flat sheet membranes, after shaping into tubular membranes or flexible hoses, are employed in a preferred embodiment of a tube module of the present invention. The tubular membranes have diameters in the range of 4 mm to 50 mm, and preferentially 8 mm to 30 mm, whereby diameters between 12 mm to 25 mm have proven to be especially advantageous in practical applications.

In a specific embodiment the tubular membrane after formation is coated or wrapped on the outside with one or several layers of a woven or non-woven fabric. Such tubular membranes show a sufficient pressure resistance and can be used without an additional support tube in a tube module.

In the following the present invention is described by the drawings. FIG. 1 shows a module of the present invention having one heating chamber on one side only, and FIG. 2 a module with heating chambers at both sides.

Tube module 101 of FIG. 1 has a cylindrical housing 102 with a multitude of axially arranged support tubes 103 with tubular membrane segments 104. In an alternative embodiment (not shown) tubular membrane segments of sufficient pressure resistance are employed without support tubes. The cylindrical housing 102 is provided with at least one connection 120 for the discharge of the permeate having passed through the membrane.

In FIG. 1 at one side of tube module 101 a respective end 105 of a tubular membrane segment 104 is fixed in a bore 108 of a separating wall 107 and connected to the end 105' of a second tubular membrane segment 104' which is fixed in a bore 108' in the separating wall 107, by means of a connector 106. In FIG. 1 the connector 106 is a U-shaped tube, it may, however, be as well a respective clearance in end plate 109. By means of such clearances in the end plate 109 several tubular membrane segments 104 may be connected. A respective sealing (not shown) is placed between end plate 109 and separating wall 107.

On the other side of tube module 101 is placed a heating chamber 110 with connections 111, 111' for the inlet and outlet of a heat transfer medium. One end 112 of a tubular membrane segment 104 is fixed in a bore 113 of a separating wall 114 and connected by an U-shaped connecting pipe 115 to a second tubular membrane segment 104' the end 112' of which is fixed to a bore 113' of the separating wall 114. The length of the U-shaped connecting pipe 115 is designed in such a way that a sufficient heat input is guaranteed into the mixture to be separated and passing through the U-shaped connecting pipe 115. The U-shaped connecting pipe 115 may be itself fixed into bores 116, 116' of an end plate 117. Then a respective gasket is placed between end plate 117 and separating wall 114 (not shown). Through heating chamber 110 lead ducts 118, 118' with connections 119, 119' for the inlet and outlet of the mixture to be separated.

Figure 2:
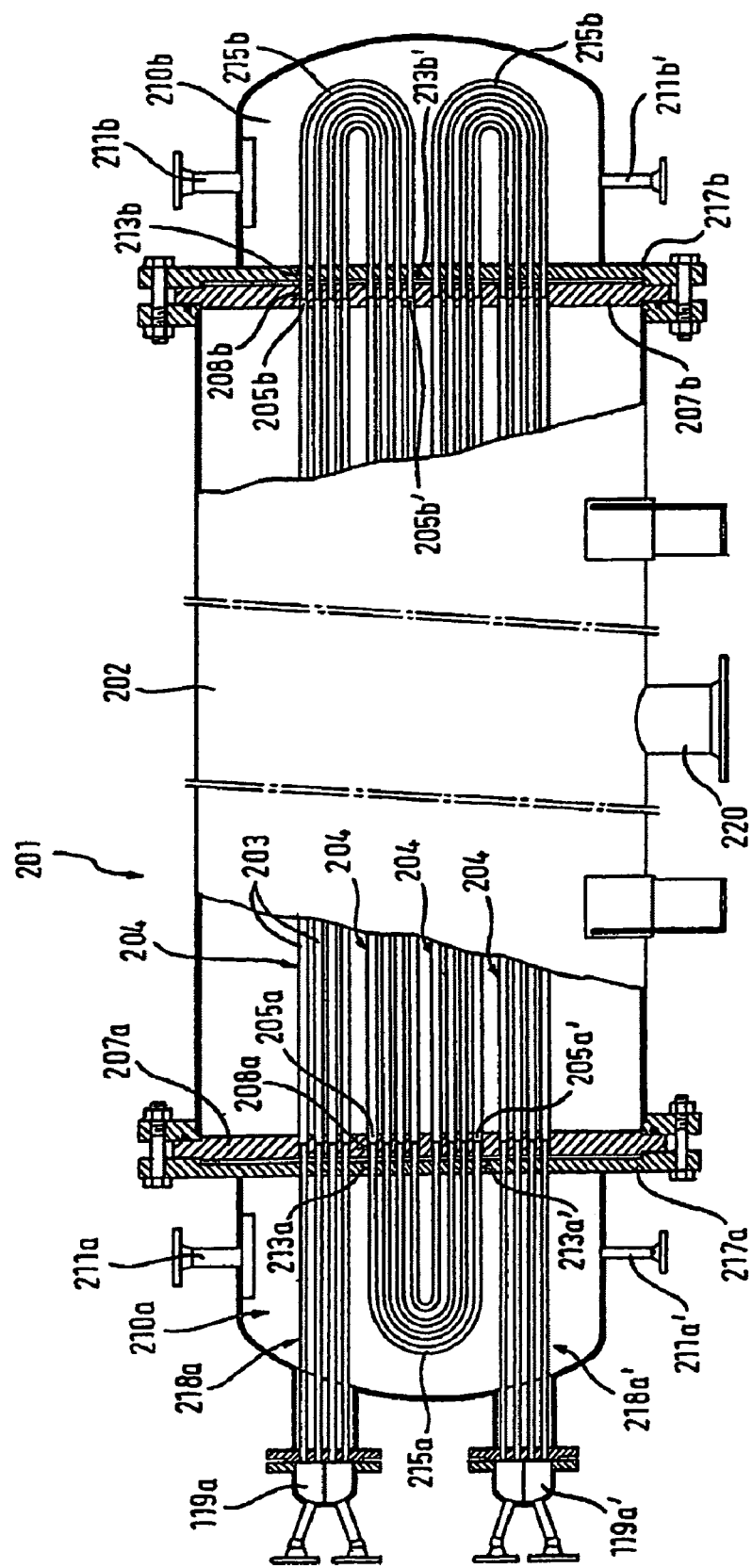
FIG. 2 shows a module of the invention with heating chambers at both sides.

FIG. 2 shows a tube module 201 according to the present invention with two heating chambers 210a, 210b. A cylindrical housing 202 of tube module 201 contains a multitude of axially arranged support tubes 203 with tubular membrane segments 204. In an alternative embodiment (not shown) tubular membrane segments of sufficient pressure resistance are employed without support tubes. The cylindrical housing 202 of tube module 201 is provided with at least one connections 220 for the discharge of the permeate which passed through the membrane. Each tubular membrane 204 is fixed at both ends 205a, 205b in bores 208a, 208b of a separating wall 207a, 207b. Each bore 208a, 208b in a separating wall 207a, 207b corresponds to a bore 213a, 213b in an end plate 217a, 217b. In the bores 213a, 213b of end plates 217a, 217b, on the side which does not show to separating walls 207a, 207b, U-shaped connecting pipes 215a, 215b are fixed, which connect each two bores 213a, 213a', 213b, 213b' in end plates 217a, 217b, and thereby each two ends 205a, 205a', 205b, 205b' of tubular membrane segments 204.

Between separating wall 207 and end plate 217, a gasket is placed, if necessary (not shown). The U-shaped connecting pipes 215a, 215b fit into heating chamber 210a, 210b, the length of the pipes is determined by the amount of heat which has to be transferred to the fluid to be separated and passing through connecting pipes 215a, 215b.

Heating chambers 210a, 210b are provides with connections 211a, 211a', 211b, 211b' for the inlet and outlet of the respective heat transfer medium. Ducts 218a, 218a' with connections 119a, 119a' for the inlet and outlet of the mixture to be separated lead through at least one of the heating chambers (210a in FIG. 2). In a specific embodiment such connections 119a, 119a' may be provided at both sides of the module.

In industrial application a module according to the present invention offers significant advantages. When used for the separation of a fluid mixture in a pervaporation process the membrane area installed in modules according to the-state-of-art is limited, as too large cooling by the evaporation of the permeate and a corresponding too large reduction of the flux has to be avoided. Such limitations are not valid for a module according to the present invention, as the fluid mixture to be separated is reheated in the heating chambers after passing through a certain length of tubular membrane segments. Thereby any loss of heat is immediately replaced; the membranes are operated at nearly constant high temperature and at optimal high fluxes. This leads, especially in pervaporation processes, to a significant reduction of the required membrane area and to a reduction of costs. The avoidance of the piping between separate modules and intermediate heat exchangers leads to a further cost reduction. In the processes of vapor permeation and gas separation the condensation of components out of the feed mixture on the membrane surface is avoided, which can lead to a blocking of the membrane and reduction of the transmembrane flux.

What is claimed is:

1. A membrane tube module, in which in a cylindrical housing a multitude of axially arranged tubular membrane segments is arranged, the cylindrical housing comprising, at one or both sides, a heating chamber containing U-shaped connecting pipes arranged therein, wherein i) the tubular membrane segments are individually supported by support tubes, ii) the open ends of the tubular membrane segments are fixed in a separating wall at both sides, iii) the U-shaped connecting pipes are fixed in an end plate, lead through the separating wall with both open ends, and connect respective two open tubular membrane segments with each other, wherein the heatable chamber forms a unit together with the U-shaped connecting pipes contained therein and the end plate, such that the unit is removable from the cylindrical housing.

2. The membrane tube module of claim 1, wherein the open ends of the tubular membrane segments are fixed spaced apart in the end plate.

3. The membrane tube module according to claim 1 for the separation of liquid mixtures in a pervaporation process.

4. The membrane tube module according to claim 2 for the separation of liquid mixtures in a pervaporation process.

* * * * *